Dec. 29, 1925.
P. T. AXELSEN
1,567,408
PROCESS OF TREATING FERTILIZERS
Filed Jan. 14, 1924
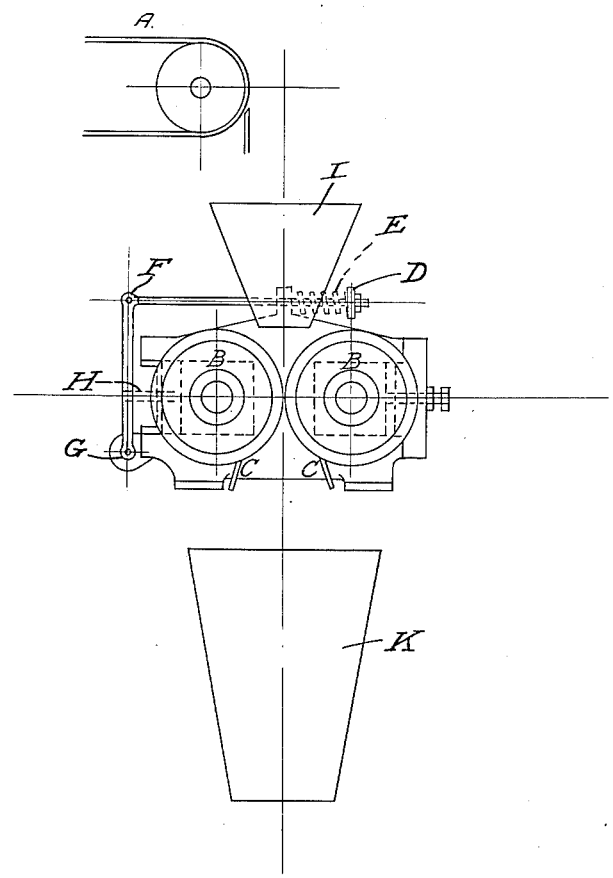
Inventor.
Peter Tony Axelsen,
By ............ atty.

Patented Dec. 29, 1925.

1,567,408

UNITED STATES PATENT OFFICE.

PETER TOMY AXELSEN, OF RJUKAN, NORWAY, ASSIGNOR TO NORSK HYDRO-ELEKTRISK KVAELSTOFAKTIESELSKAB, OF CHRISTIANIA, NORWAY.

PROCESS OF TREATING FERTILIZERS.

Application filed January 14, 1924. Serial No. 686,166.

*To all whom it may concern:*

Be it known that I, PETER TOMY AXELSEN, a subject of the King of Norway, residing at Rjukan, Norway, have invented certain new and useful Improvements in Processes of Treating Fertilizers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Many substances have a great disadvantage in that when they have been stored for some time, they become caked and turn into a solid lump which, when they are going to be used, it takes a great deal of trouble to get out of the store-rooms and the packing. In the case of fertilizers, this is especially a drawback, as one must count on the fertilizers being stored up to one year. The contents of the bags and barrels then often prove to be a hard lump which has to be pulverized anew before it can be strewn. A series of processes have been suggested for doing away with this disadvantage, for instance, by the adding of various substances or by granulating, whereby the material is transferred into a more or less granular condition. However, these processes are comparatively expensive, so new and cheaper methods are continually being looked for.

An especially cheap and effective process is the object of the present invention which consists in pressing the material to be treated between smooth, rotatory rollers, cooled inside with water, so that it is transferred into thin, hard sheaves. When the pressure is high enough, the surface of these sheaves becomes bright and smooth, so that when stored they do not stick together and form lumps.

The accompanying drawing diagrammatically illustrates an apparatus by which this process may be carried out. The apparatus comprises two revolving water-cooled rollers B B, with smooth polished surfaces. The space between the rollers and consequently also the pressure which the rollers exert upon the fertilizer substance which passes between the same can be adjusted by means of the nut D, whereby the spring E is given a greater or less tension which is again transferred to the rollers through the system of levels F, G, the pressure being transferred at H. Further the apparatus is provided with scrapers C, which scrape off such particles which might possibly adhere.

The fertilizer substance which is brought forward upon the conveyor A drops down into the hopper I, wherefrom it again drops down between the revolving rollers. These latter are so adjusted that the pressure to which the mass is subjected becomes so great as to cause the particles to grow together and form hard sheaves with a glassy surface. The substance from the rollers falls down into the silo K, from where it is conveyed to storage silos or packing houses. The substance usually falls down from the rollers in pieces of such a small size as to make a further pulverization unnecessary.

Claims:

1. The method of treating fertilizer which comprises passing the fertilizer in a solid pulverulent condition under pressure between smooth rotating surfaces and thereby forming the fertilizer into thin, polished compacted sheaves capable of being stored without coalescing into lumps.

2. The method of treating fertilizer which comprises passing the fertilizer in a solid pulverulent condition under pressure between polished rotating surfaces and thereby forming the fertilizer into thin, polished compacted sheaves capable of being stored without coalescing into lumps.

3. The method of treating fertilizer which comprises forming the fertilizer into thin, hard sheaves by compressing the same while in a solid pulverulent condition between cool revolving rolls whereby the surfaces of the sheaves become bright and smooth.

4. The method of treating fertilizer which comprises passing the material between rolls having polished surfaces and under sufficient pressure to form the fertilizer into thin hard sheaves while maintaining the rolls cool, whereby the surfaces of the sheaves are rendered bright and smooth.

In testimony that I claim the foregoing as my invention, I have signed my name.

PETER TOMY AXELSEN.